US00RE43735E

(19) United States
(12) Reissued Patent
Fickett

(10) Patent Number: US RE43,735 E
(45) Date of Reissued Patent: Oct. 16, 2012

(54) ARROW QUIVER

(76) Inventor: Glenn Fickett, Tempe, AZ (US)

(21) Appl. No.: 13/045,595

(22) Filed: Mar. 11, 2011

Related U.S. Patent Documents

Reissue of:
(64) Patent No.: 7,631,754
Issued: Dec. 15, 2009
Appl. No.: 11/346,120
Filed: Feb. 2, 2006

(51) Int. Cl.
*B65D 85/00* (2006.01)
(52) U.S. Cl. ..... 206/315.11; 206/315.1; 224/916
(58) Field of Classification Search ..... 206/45.2, 206/45.23, 315.1, 315.11; 224/578, 579, 224/560, 916; 248/171, 431, 432, 435
See application file for complete search history.

(56) References Cited

U.S. PATENT DOCUMENTS

| | | | | |
|---|---|---|---|---|
| 2,542,137 | A | 2/1951 | Hanson | |
| 2,974,702 | A | 3/1961 | Floyd | |
| 2,975,888 | A | 3/1961 | Paynton | |
| 2,984,277 | A | 5/1961 | Neff | |
| 3,010,502 | A | 11/1961 | Sundquist | |
| 3,301,386 | A | 1/1967 | Carter | |
| 4,915,332 | A | 4/1990 | Ouellette | |
| 4,955,473 | A | 9/1990 | Van Hout et al. | |
| 5,096,104 | A | 3/1992 | Wirth | |
| 7,267,237 | B1 | 9/2007 | Jones et al. | |
| 7,631,754 | B1 * | 12/2009 | Fickett | 206/315.11 |
| 2005/0207749 | A1 | 9/2005 | Barker et al. | |
| 2005/0211284 | A1 | 9/2005 | Dooley | |
| 2006/0086768 | A1 | 4/2006 | Cotlong | |

* cited by examiner

*Primary Examiner* — David Fidei
(74) *Attorney, Agent, or Firm* — Adam R. Stephenson, Ltd.

(57) ABSTRACT

A quiver is disclosed which includes a generally cylindrical body having an open upper end and an open lower end. The quiver has a stand with a closed position telescopically received within the body and an open position extending from the open lower end. The stand having three or more legs which provide support for the body in the open position.

16 Claims, 7 Drawing Sheets

ARROW QUIVER

Matter enclosed in heavy brackets [ ] appears in the original patent but forms no part of this reissue specification; matter printed in italics indicates the additions made by reissue.

TECHNICAL FIELD

This invention relates in general to a arrow quivers, and, more particularly, to an arrow quiver having a built in stand

BACKGROUND OF THE INVENTION

The simple purpose of an arrow quiver is to carry and store arrows. Safety is enhanced by a quiver, too, as the arrows are neatly tucked away until ready for shooting. Carrying loose arrows can be hazardous for anyone, but especially for children. Quivers come in many shapes and materials. These handy arrow holders come in shoulder, hip and back models.

However, in modern times, arrows are carried or stored by differing products. The quivers as depicted in movies used to carry and store arrows are not as useful as in the past. Archery in its modern embodiments generally involves shooting at targets in archery ranges. Thus, there is a need for modern quivers which allow convenient storage of arrows at archery ranges or other stationary locations, for example, a hunter's blind.

The present invention meets this need

SUMMARY OF THE INVENTION

It is an object of this invention to provide a quiver which includes a built in stand.

It is a further object of this invention to provide a quiver which provides attachment points for additional features.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
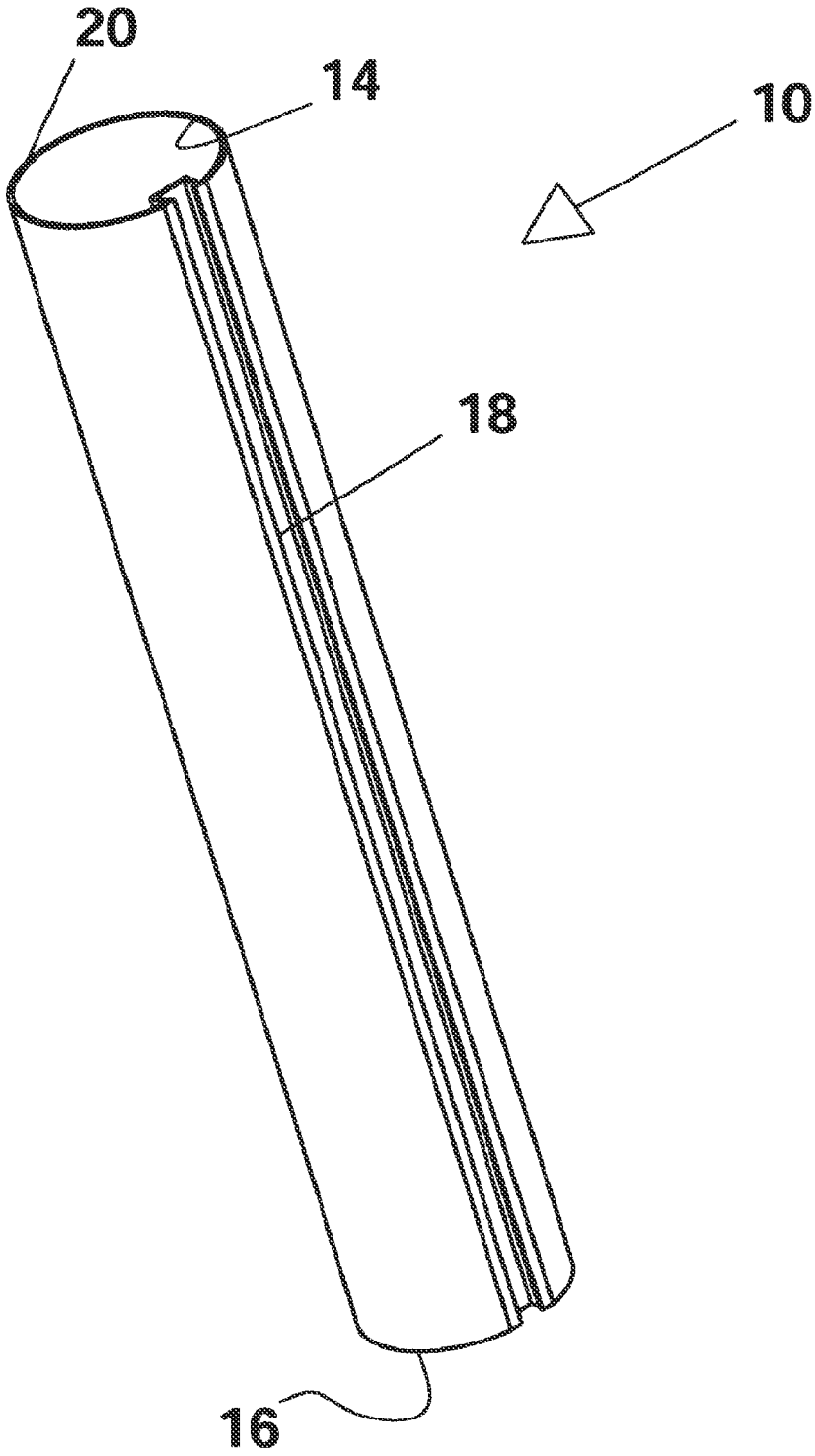
FIG. 1 is a perspective view of a quiver of the present invention.
Figure 2:
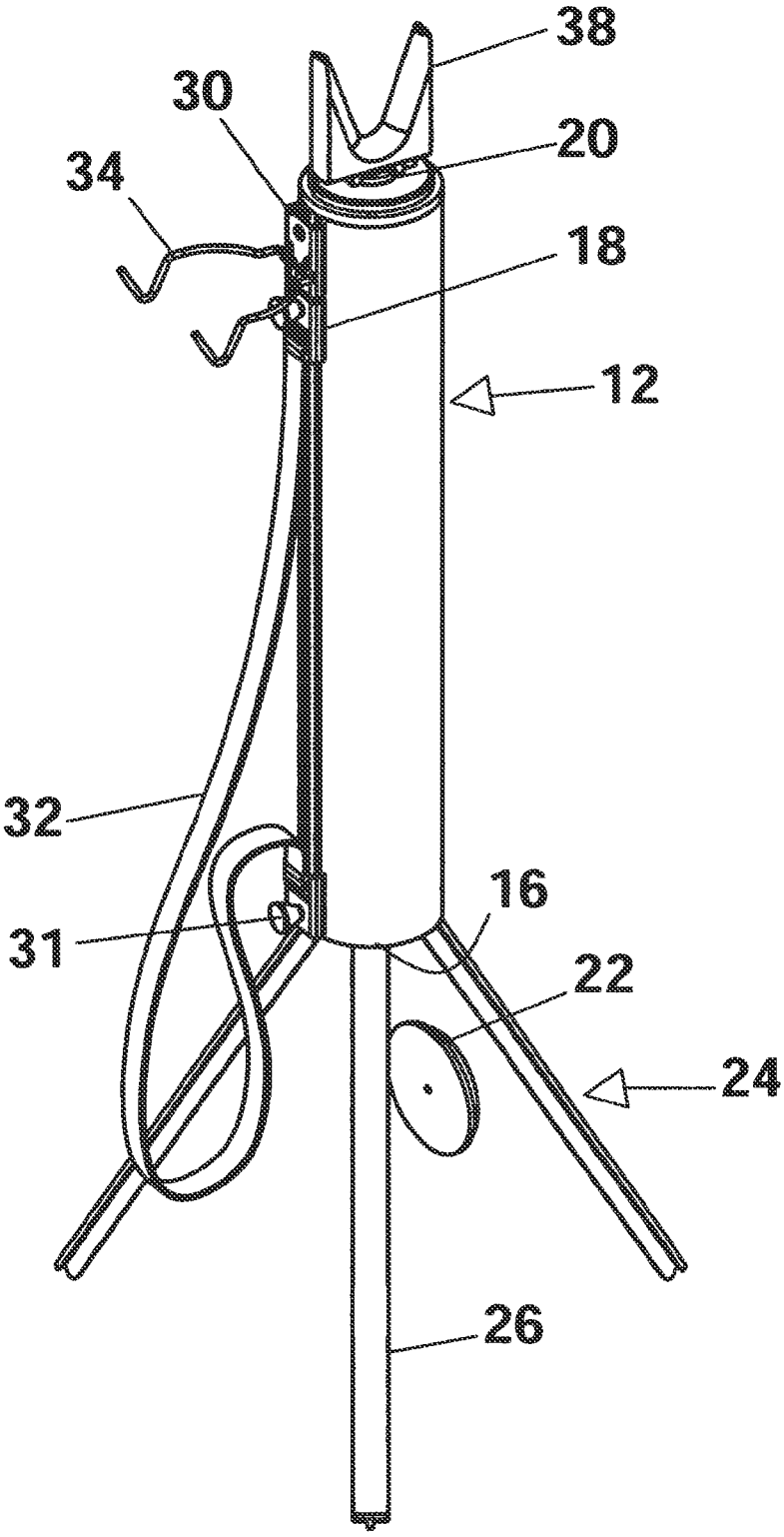
FIG. 2 is an perspective view of an alternate embodiment of the quiver.
Figure 3:
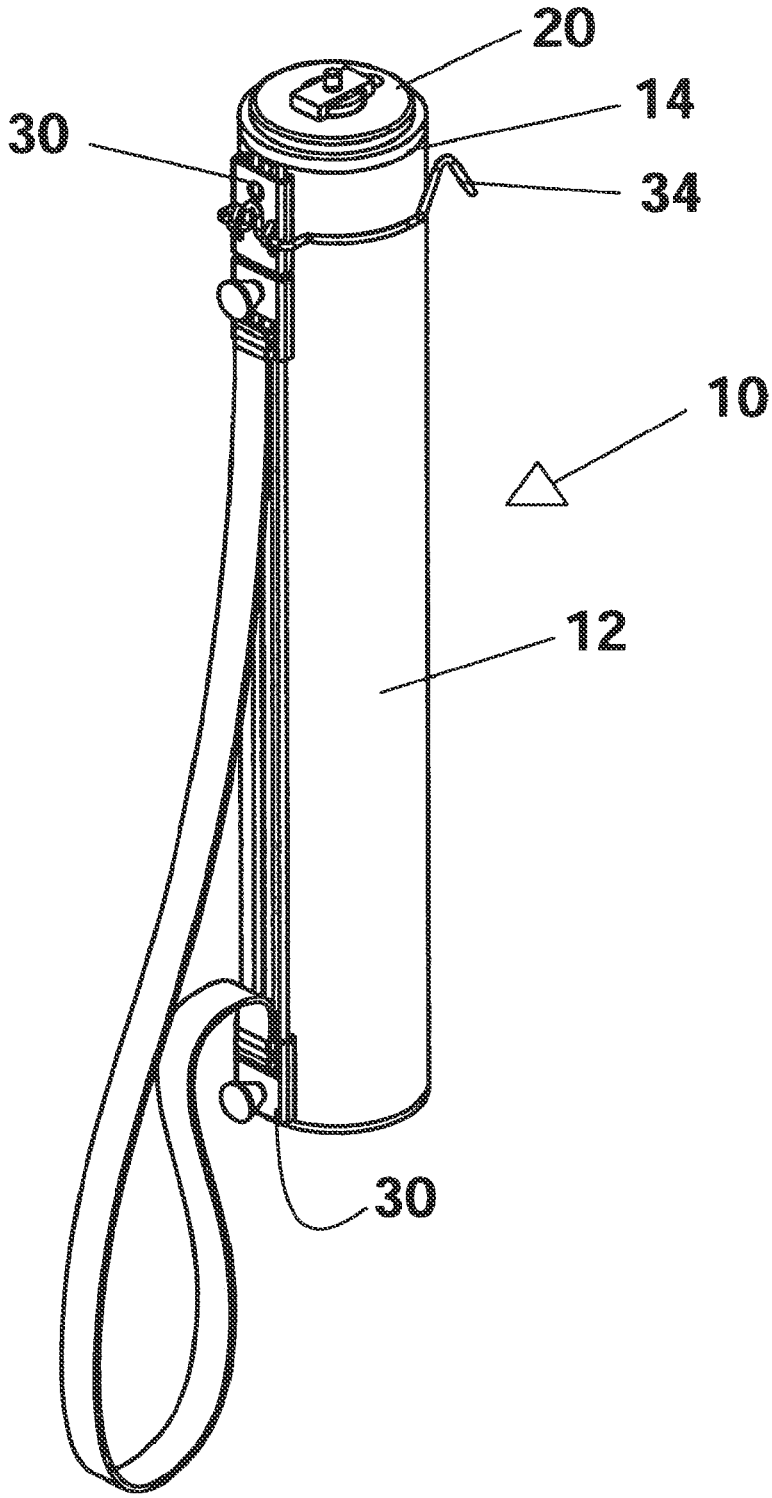
FIG. 3 is a perspective view of the embodiment FIG. 2 in an closed form.

A quiver 10 of the present invention, as seen in FIGS. 1-3, comprises a generally cylindrical body 12 which is open *at* both its upper end 14 and lower end 16. At least one track 18 is provided mounted to the exterior of body 12 [which] *or is in the body, i.e., is located within the circumference of body 12 as illustrated in FIG. 1 by being integrally formed in or coupled into the body as a portion of the body. Track 18* extends parallel to the axis of body 20. In the preferred embodiment, open upper end 14 is provided with an upper cap 20 and lower end [16] *15* is provided with a lower cap 22.

As best seen in FIGS. 1 and 2, a tripod stand 24 having three legs 26 extends from lower end 16. When not in use, legs 26 are telescopically received into and stored within body 12 as shown in FIG. 3. To use, lower cap 22 is removed and tripod stand 24 manually pulled downward from body 12. In the most preferred embodiment, legs 26 are biased to a stand up position supporting quiver 12 vertically as shown in FIGS. 1 and 2 with, for example, springs though other mechanisms are certainly within the scope of the invention.

With tripod stand 24 set up, body 12 is empty and once upper cap 20 is removed, arrows can be placed therein. An archer would simply place arrows within device 10 and draw out for shooting as needed.

Track 18 has one or more trucks 30 which are slidably received thereon. In the illustrated embodiment, trucks 30 are provided with pins 31 which are adapted to engage corresponding holes 33 to lock each truck 30 into a desired location on track 18. Those skilled in the art will recognize that any other mechanisms besides pins and holes can be used to slide and hold trucks 30 as desired and the illustrated embodiment is for exemplary purposes only.

Trucks 30 can be used to provide attachment points for optional features of quiver 10. For example, as shown in FIGS. 2 and 3, two trucks 30 have a carrying strap 32 extending therebetween. A user can employ pins 31 to move trucks 30 upwardly and downwardly along track 18 to provide optimal comfort when carrying quiver 10.

Figure 4:
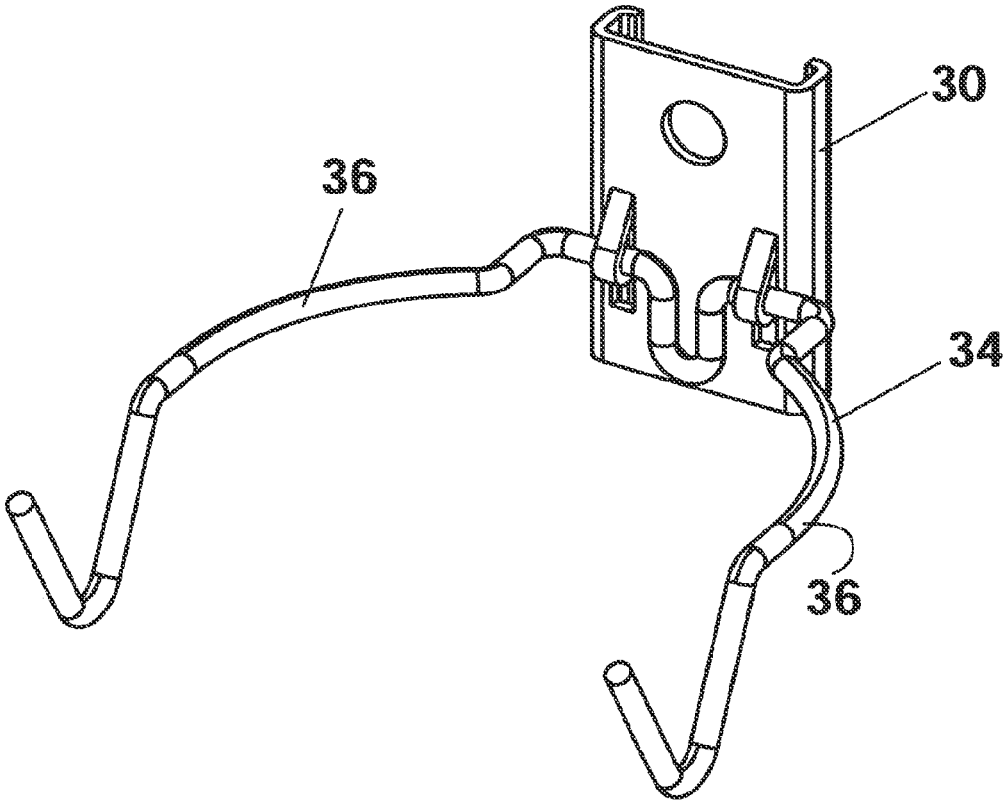
FIG. 4 is a close up perspective view of a bow rest used in the embodiment of FIG. 2.

In another example shown in FIGS. 2, 3 and 4, truck 30 is provided with a bow rest 34 having two bow rest arms 36 which is rotatable mounted thereto. Bow rest 34 has a stored position seen in FIG. 3 wherein bow rest arms 36 extend around body 12 and a use position seen in FIG. 2 with bow rest arms 36 extending laterally away from body 12. In this position, a bow can be mounted thereon when not in use.

Figure 5:
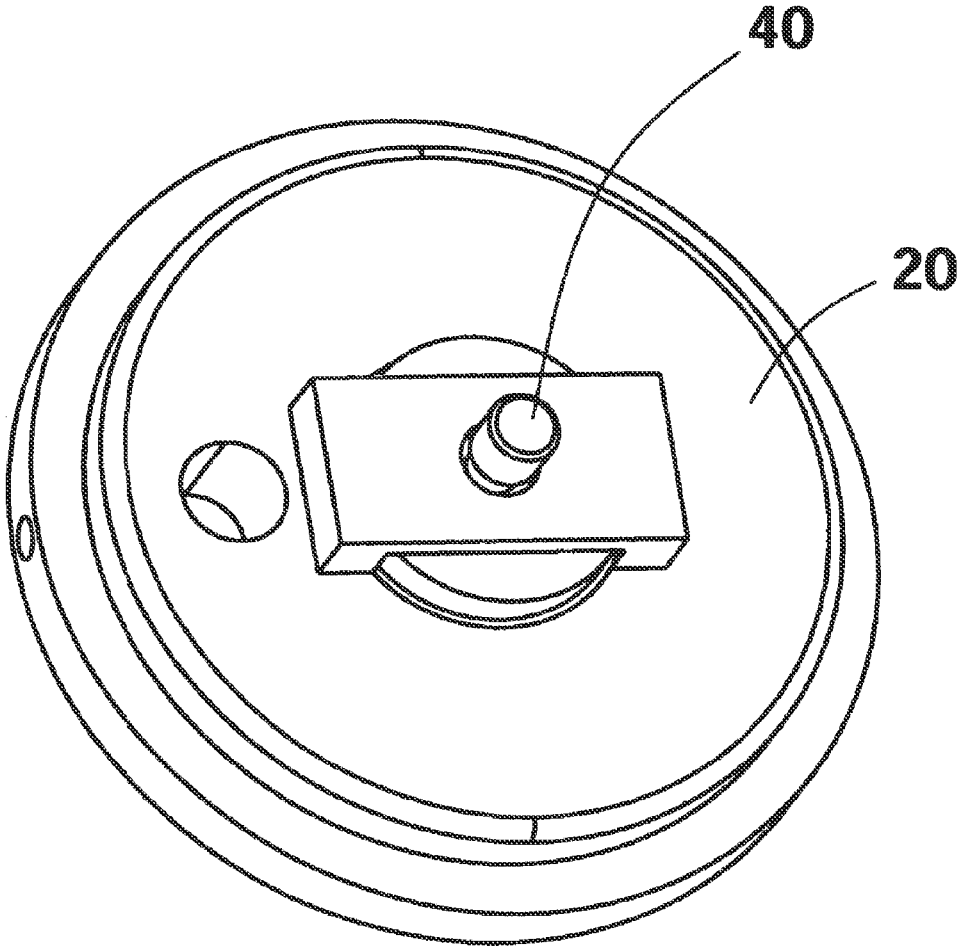
FIG. 5 is a close up perspective view of a cap used in the embodiment of FIG. 2.

In another alternate embodiment shown in FIG. 2, a generally U-shaped gun rest 38 is mounted to upper cap 20. A user can employ gun rest 38 for sighting and steadying firearms for use. Alternatively, as shown in FIG. 5, cap 20 employs a camera mount 40 allowing a user to use quiver 10 as a camera tripod. When either camera mount 40 or gun rest 38 are not in use, cap 20 can be inverted to store same within body 20.

Figure 6:
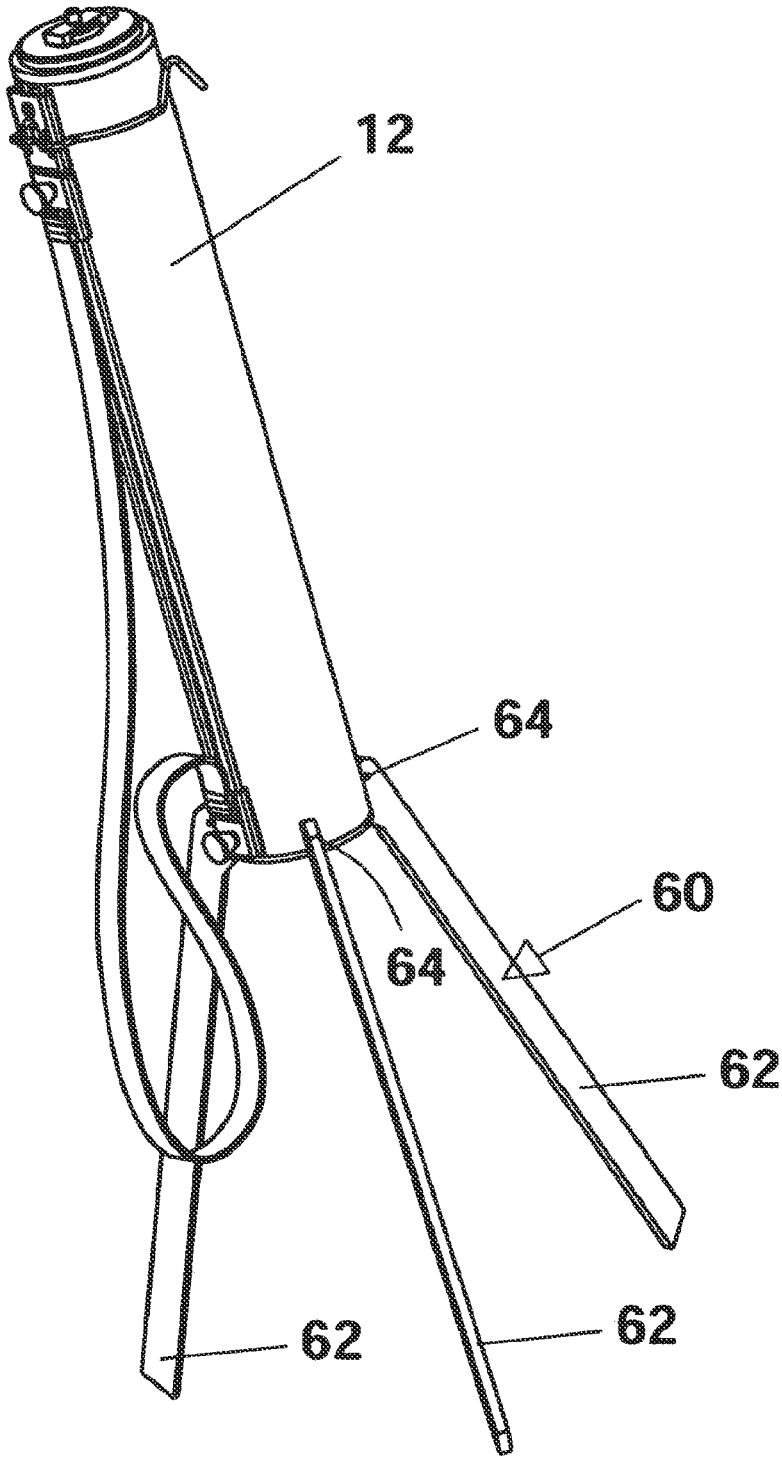
FIG. 6 is a perspective view of art alternate embodiment of the quiver of the present invention in an open stand form.
Figure 7:
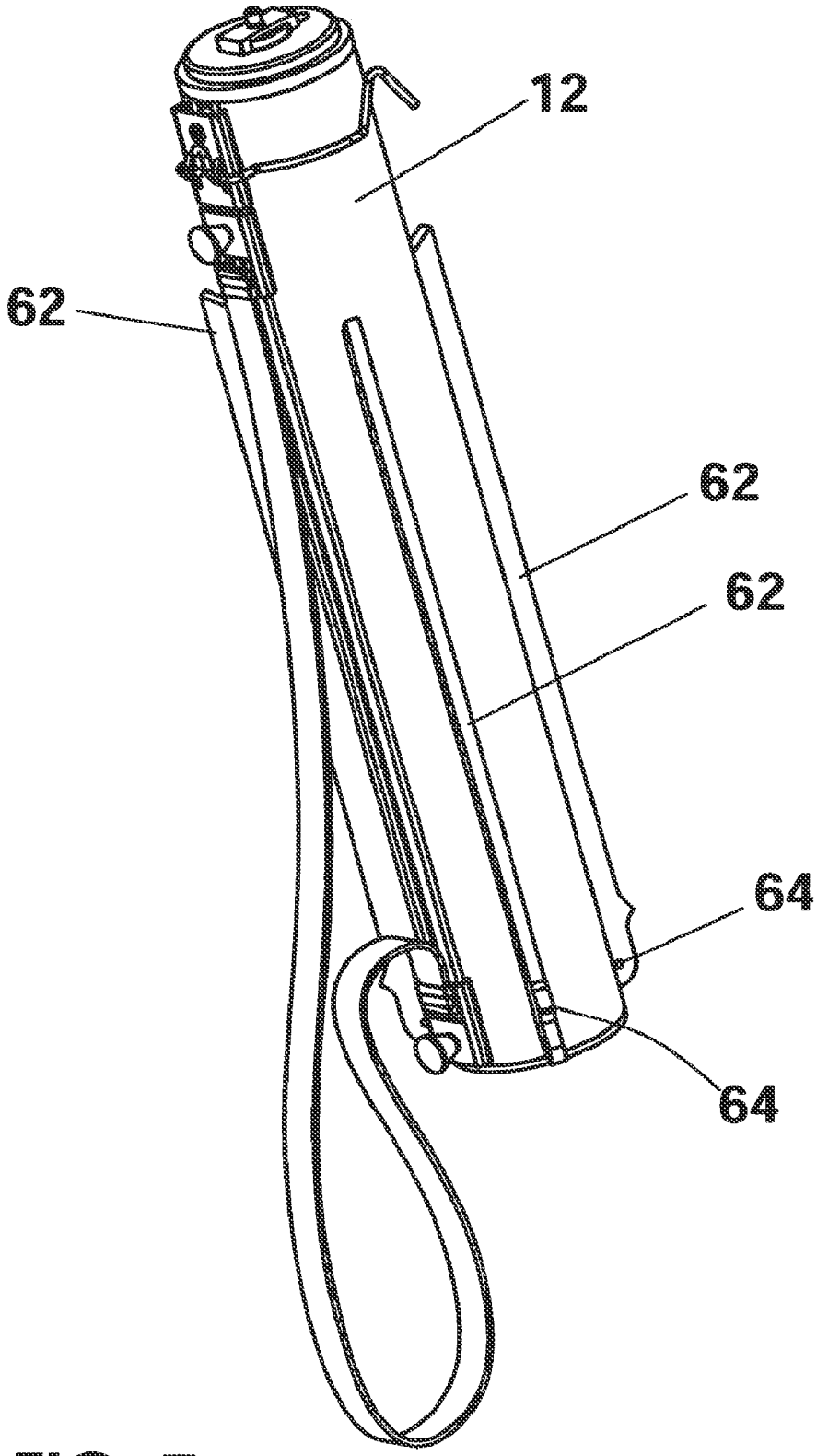
FIG. 7 is a perspective view of the alternate embodiment of FIG. 6 is a closed form.

As best seen in FIGS. 6 and 7, an exterior tripod stand 60 having three legs 62 extends from lower end 16. When not in use, each leg 62 is folded upwardly and outwardly about a pivot 64 to closely abut body 12 as shown in FIG. 7. To use, each leg 62 is folded downwardly and outwardly to the position illustrated in FIG. 6.

Although only certain embodiments have been illustrated and described, it will be apparent to those skilled in the art that various changes and modifications may be made therein without departing from the spirit of the invention or from the scope of the appended claims.

What is claimed is:

1. A quiver comprises:

a generally cylindrical body having an open upper end and an open lower end, a stand having a closed position telescopically received within the body, the stand having an open position extending from the open lower end, the stand having three or more legs which provide support for the body in the open position, at least one track mounted to the exterior of the body which extends parallel to the axis of the body, one or more trucks adapted to be slidably received on the at least one track, the one or more trucks providing attachment points for optional devices, wherein one of the at least one trucks is provided with a bow rest, wherein the bow rest has two arms, the bow rest having a stored position wherein the bow rest arms extend around the body and a use position wherein the bow rest arms extend laterally away from the body, the bow rest being rotatably mounted to the one of the at least one trucks to move between the stored position and the use position.

2. The quiver of claim 1 wherein the open upper end is provided with an upper cap and the open lower end is provided with a lower cap.

3. The quiver of claim 2 further comprising a generally U-shaped gun rest mounted to the upper cap.

4. The quiver of claim 2 further comprising a camera mount mounted to the upper cap.

5. The quiver of claim 1 wherein the stand has three legs.

6. The quiver of claim 1 wherein the three or more legs are biased away from each other in the open position.

7. The quiver of claim 1 wherein each of the one or more trucks is provided with a pin adapted to engage corresponding holes in the at least one track, the pin and corresponding hole locking said truck into a desired location on the at least one track.

8. The quiver of claim 1 having at least two trucks, the at least two trucks having a carrying strap extending between two of the at least two trucks.

9. A quiver comprises:

a generally cylindrical body having an open upper end and an open lower end, the open upper end being provided with an upper cap and the open lower end being provided with a lower cap, a stand having a closed position telescopically received within the body, the stand having an open position extending from the open lower end, the stand having three legs which provide support for the body in the open position, the three legs being biased away from each other in the open position, at least one track mounted to the exterior of the body which extends parallel to the axis of the body, and one or more trucks adapted to be slidably received on the at least one track, the one or more trucks providing attachment points for optional devices, each of the one or more trucks being provided with a pin adapted to engage corresponding holes in the at least [on] *one* track, the pin and corresponding hole locking said truck into a desired location on the at least one track, wherein one of the at least one trucks is provided with a how rest, wherein the bow rest has two arms, the bow rest having a stored position wherein the bow rest arms extend around the body and a use position wherein the bow rest arms extend laterally away from the body, the bow rest being rotatably mounted to the one of the at least one trucks to move between the stored position and the use position.

10. The quiver of claim 9 further comprising a generally U-shaped gun rest mounted to the upper cap.

11. The quiver of claim 9 further comprising a camera mount mounted to the upper cap.

12. The quiver of claim 9 having at least two trucks, the at least two trucks having a carrying strap extending between two of the at least two trucks.

*13. A quiver comprises:*

*a generally cylindrical body having an open upper end and an open lower end;*

*a stand having a closed position telescopically received within the body, the stand having an open position extending from the open lower end, the stand having three or more legs which provide support for the body in the open position;*

*at least one track located within a circumference of the body which extends parallel to the axis of the body; and*

*one or more trucks adapted to be slidably received on the at least one track.*

*14. The quiver of claim 13 wherein one of the at least one trucks is provided with a bow rest, wherein the bow rest has two arms, the bow rest having a stored position wherein the bow rest arms extend around the body and a use position wherein the bow rest arms extend laterally away from the body, the bow rest being rotatably mounted to the one of the at least one trucks to move between the stored position and the use position.*

*15. A quiver comprises:*

*a generally cylindrical body having an upper end and a lower end;*

*an exterior stand comprising three or more legs, each of the three or more legs coupled to the body through a pivot at a first end; and*

*wherein each of the three or more legs is configured to reach a closed position when a second end of each leg is folded upwardly about the pivot to closely abut the body;*

*wherein each of the three or more legs is configured to reach an open position when the second end of each leg is folded downwardly about the pivot past the lower end; and*

*wherein the three or more legs are configured to provide support for the body when in the open position; and*

*at least one track located within a circumference of the body which extends parallel to the axis of the body; and*

*one or more trucks adapted to be slidably received on the at least one track.*

*16. The quiver of claim 15 wherein one of the at least one trucks is provided with a bow rest, wherein the bow rest has two arms, the bow rest having a stored position wherein the bow rest arms extend around the body and a use position wherein the bow rest arms extend laterally away from the body, the bow rest being rotatably mounted to the one of the at least one trucks to move between the stored position and the use position.*

* * * * *

UNITED STATES PATENT AND TRADEMARK OFFICE

CERTIFICATE OF CORRECTION

PATENT NO. : RE43,735 E
APPLICATION NO. : 13/045595
DATED : October 16, 2012
INVENTOR(S) : Glenn A. Fickett It is certified that error appears in the above-identified patent and that said Letters Patent is hereby corrected as shown below:

In the Specifications

Column 2, line 26, cancel the text "will recognize that any other" and insert --will recognize that many other--

Signed and Sealed this
Twenty-fifth Day of June, 2013

Teresa Stanek Rea
*Acting Director of the United States Patent and Trademark Office*